United States Patent
Leone et al.

(10) Patent No.: US 7,487,750 B2
(45) Date of Patent: Feb. 10, 2009

(54) VARIABLE INTAKE VALVE AND EXHAUST VALVE TIMING STRATEGY FOR IMPROVING PERFORMANCE IN A HYDROGEN FUELED ENGINE

(75) Inventors: Thomas Leone, Ypsilanti, MI (US); Brad Boyer, Canton, MI (US); William Stockhausen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 73 days.

(21) Appl. No.: 11/289,804

(22) Filed: Nov. 29, 2005

(65) Prior Publication Data

US 2007/0119428 A1    May 31, 2007

(51) Int. Cl.
*F02B 43/00* (2006.01)
*F02B 75/02* (2006.01)
*F02B 33/00* (2006.01)
*F01L 1/34* (2006.01)

(52) U.S. Cl. .............. 123/90.15; 123/527; 123/435; 123/436; 123/559.1; 123/DIG. 13

(58) Field of Classification Search .......... 123/1 A, 123/90.15, 90.11, 435–436, 345–348, 568.11, 123/568.14, 559.1, DIG. 12, 527, 316
See application file for complete search history.

(56) References Cited

U.S. PATENT DOCUMENTS 5,183,011 A * 2/1993 Fujii et al. .......... 123/1 A
5,305,714 A * 4/1994 Sekiguchi et al. ........ 123/3
6,155,212 A * 12/2000 McAlister .............. 123/3
6,340,005 B1 * 1/2002 Keast et al. .......... 123/27 GE
6,405,694 B2 6/2002 Sato
6,612,269 B2 * 9/2003 Heffel et al. .......... 123/1 A
6,655,324 B2 * 12/2003 Cohn et al. ............ 123/1 A
6,820,706 B2 * 11/2004 Ovshinsky et al. ...... 180/65.1
6,988,492 B2 * 1/2006 Shetley ................ 123/525
7,028,644 B2 * 4/2006 Cohn et al. ............ 123/1 A
7,111,452 B2 * 9/2006 Miyoshi et al. .......... 60/285
7,117,830 B1 * 10/2006 Boyer et al. .......... 123/90.15
2005/0000486 A1 1/2005 Kuzuyama et al.
2005/0229872 A1 * 10/2005 Lange ................. 123/3
2006/0283423 A1 * 12/2006 Ito .................. 123/406.45

FOREIGN PATENT DOCUMENTS

JP    63-198762    * 8/1988
JP    2006-188976    * 7/2006
WO   WO 2004/060708    7/2004

* cited by examiner

*Primary Examiner*—Hai H Huynh
(74) *Attorney, Agent, or Firm*—Julia Voutyras; Alleman Hall McCoy Russell & Tuttle LLP

(57) ABSTRACT

A method for a hydrogen fueled internal combustion engine to reduce backfiring, pre-ignition, and/or backflash, the engine also including a combustion chamber, an intake manifold, an exhaust manifold, at least one intake valve, at least one exhaust valve, a hydrogen injector, a compression device, and a variable valve timing system coupled to the intake valves. The method comprises compressing air using the compression device; injecting hydrogen and mixing at least said hydrogen with air discharged from the compression device; and opening the intake valve to induct at least air into the combustion chamber, wherein the intake valve opening time varies with an operating condition.

21 Claims, 3 Drawing Sheets

VARIABLE INTAKE VALVE AND EXHAUST VALVE TIMING STRATEGY FOR IMPROVING PERFORMANCE IN A HYDROGEN FUELED ENGINE

FIELD

The present application relates generally to a system and method for reducing backfire, pre-ignition, and/or backflash in a hydrogen fueled internal combustion engine, and more specifically to a system and method that varies the intake valve timing and/or exhaust valve timing to reduce backfire, pre-ignition and/or backflash.

BACKGROUND AND SUMMARY

An engine may burn gaseous fuels such as hydrogen ($H_2$), natural gas, lighter flammable hydrocarbon derivatives, etc. Using gaseous fuel in an internal combustion engine can provide various advantages compared to liquid fuel injection. Examples of such advantages may include reduction of exhaust emissions of nitrogen oxides, particulate matter, and hydrocarbons as well as increased fuel renewability and transferability.

In the example of hydrogen fueled engines, the hydrogen may be exposed to hot residual gases as well as heated engine components, such as the intake manifold. The gas may also be exposed to heat from the cylinder head porting, piston, valves, and walls of a combustion chamber during the intake stroke. This exposure can increase a propensity of the fuel to backfire, pre-ignite, and/or backflash, as well as reduce engine output. Further, such effects can be exacerbated if the hydrogen injection duration is extended.

One approach to address some issues of gaseous fuel delivery is to directly inject the gaseous fuel into the combustion chamber and then induct air after the completion of fuel injection. Specifically, JP 63-198,762 describes a method of directly injecting hydrogen into a combustion chamber. In the '762 reference, it appears that the exhaust valve is closed very near, if not at, top dead center of piston position when an exhaust stroke is completed. Further, the hydrogen injection valve is opened immediately after this exhaust valve is closed to inject hydrogen gas into a combustion chamber. Next, after the hydrogen injection valve is closed at the rotation position of the crank angle of about 90 degrees, the suction (intake) valve is opened, and supercharged air is fed to the combustion chamber and mixed with hydrogen. Then, the mixture is compressed and ignited.

However, the inventors herein have recognized that backfiring, pre-ignition, and backflash may still occur. For example, injected hydrogen may be exposed to hot combustion chamber surfaces because the hydrogen is injected at top dead center immediately after the completion of an exhaust stroke. Further, a propensity of combustion anomalies such as backfiring, pre-ignition, and/or backflash may increase when the heated hydrogen is mixed with heated boosted air inducted into the combustion chamber.

Therefore, in one embodiment, at least some of such issues may be addressed by a method for a hydrogen fueled internal combustion engine, the engine also including a combustion chamber, an intake manifold, an exhaust manifold, at least one intake valve, at least one exhaust valve, a hydrogen injector, and a compression device. The method comprises compressing air using the compression device; injecting hydrogen and mixing at least said hydrogen with air discharged from the compression device; and opening the intake valve to induct at least air into the combustion chamber, wherein the intake valve opening time varies with an operating condition. The operation condition may include one or more of temperature, speed, and load of engine that each may provide an indication of a tendency of backfiring, pre-ignition, and/or backflash.

In this way, engine efficiency may be improved by reducing backfiring, pre-ignition, and backflash. For example, in one embodiment, under conditions when backfiring, pre-ignition and/or backflash are more likely (e.g. high temperature), intake valve opening can be retarded to provide additional time before the hydrogen and/or air is inducted into the cylinder. This allows metal surfaces of the combustion chamber including the head porting more time to cool. Additionally, after the exhaust valve closes and before the intake valve opens, the downward piston motion of the intake stroke expands the combustion chamber content until the intake valve opens. This expansion may result in lower gas pressure and temperature, and thus a cooler environment for the hydrogen/air mixture to enter when the intake valve finally opens. However, under conditions where such cooling is not needed, intake valve opening may be less retarded or may be kept near the top dead center thereby to reduce any pumping losses.

Further, any reduction in torque and power due to volumetric efficiency by the late intake valve opening (and potentially late intake valve closing) can be compensated by the boosting of the intake air.

According to another aspect, a method is provided for a hydrogen fueled internal combustion engine, the engine also including a combustion chamber, an intake manifold, an exhaust manifold, at least one intake valve, at least one exhaust valve, a hydrogen injector, and a compression device. The method comprises compressing air using the compression device; injecting hydrogen and mixing at least said hydrogen with air discharged from the compression device; and opening the intake valve to induct a mixture of at least hydrogen and air into the combustion chamber wherein the intake valve opening time varies with a first operating condition; and varying the exhaust valve closing time with a second operating condition. In one embodiment, the exhaust valve closing time is advanced with respect to the top dead center when the engine speed is low. In another embodiment, the exhaust valve closing is retarded with respect to the top dead center when the engine speed is high. Further still, such adjustment can be combined in yet another embodiment.

Again, such operation can provide various advantages. For example, at low engine speed, the late intake valve opening and the early exhaust valve closing may increase fuel efficiency compared with varying the intake valve timing alone. At high engine speed, the late intake valve opening and the late exhaust valve closing may also reduce a tendency for combustion anomalies by reducing exhaust residuals.

Note that various intake and exhaust valve configurations may be used, such as electrically actuated valves, variable camshaft phasing, cam lobe switching, multiple intake valves, multiple exhaust valves, and combinations thereof. Also, note that injecting hydrogen may include injecting pure hydrogen or mixture of hydrogen and gaseous fuel such as natural gas, for example. Additionally, hydrogen may be mixed with other gases besides air. For example, hydrogen may be mixed with air and recirculated exhaust gas.

DETAILED DESCRIPTION

Figure 1:
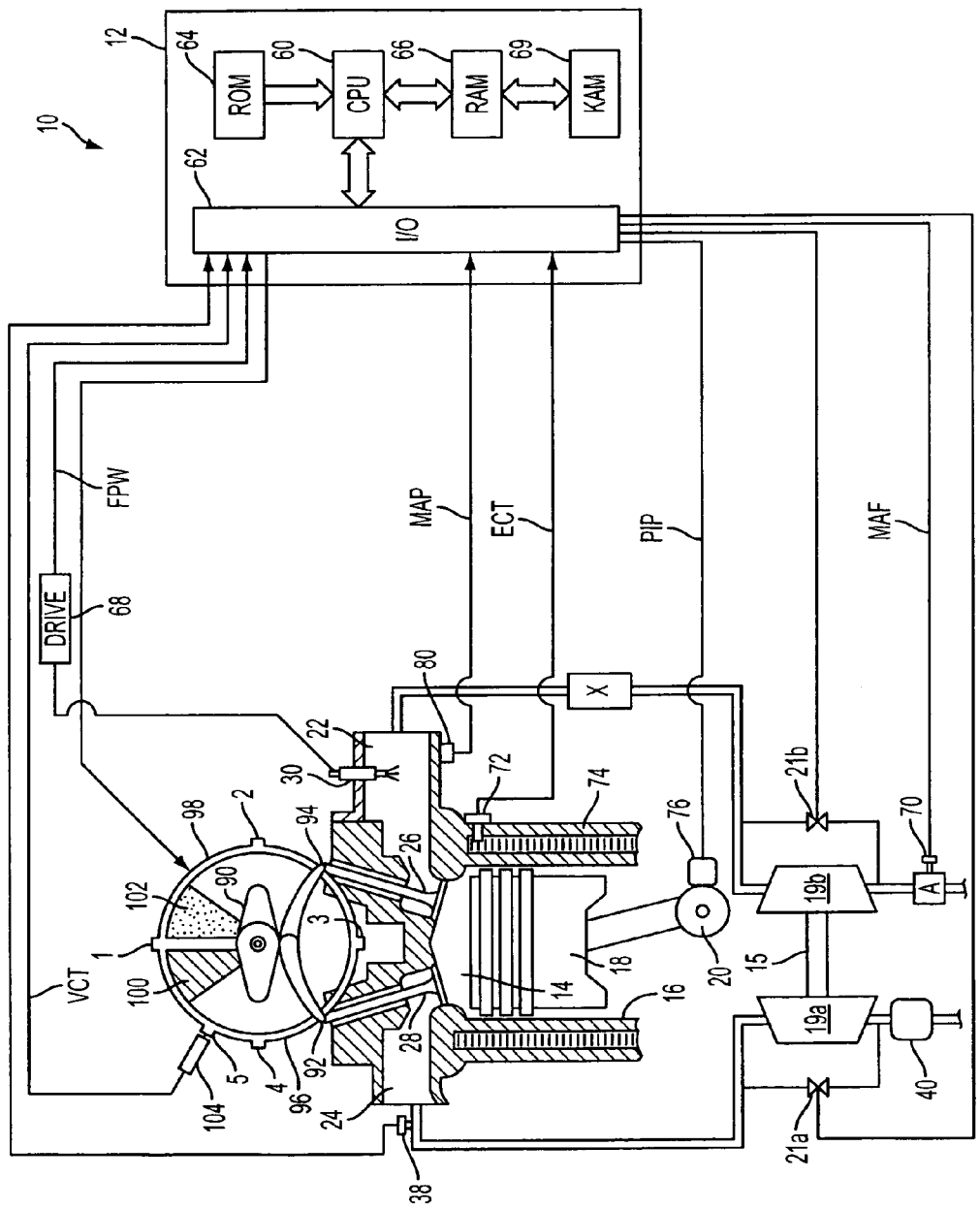
FIG. 1 is a schematic depiction of an exemplary embodiment of a hydrogen fueled engine.

FIG. 1 shows, generally at 10, an exemplary embodiment of one cylinder of a multi-cylinder engine, intake and exhaust paths connected to that cylinder, and an exemplary embodiment of a camshaft having a variable timing mechanism for controlling the valves of the cylinder. It will be appreciated that the configuration of engine 10 is merely exemplary, and that the systems and methods described herein may be implemented in any other suitable engine. Further, the engine may be spark ignited via a spark plug located in the cylinder (not shown), the timing of which may be varied with operating conditions. While this example shows a system for varying intake and exhaust timing, in practice, separate systems may be used. For example, one system is used for adjusting intake valve timing (opening and/or closing) and another for adjusting exhaust valve timing (opening and/or closing). Further, additional adjustment may be used, such as variable valve lift, if desired.

Continuing with FIG. 1, engine 10 is controlled by electronic engine controller 12. Combustion chamber, or cylinder, 14 of engine 10 is shown including combustion chamber walls 16 with piston 18 positioned therein and connected to crankshaft 20. Combustion chamber 14 is shown communicating with intake manifold 22 and exhaust manifold 24 past intake valve 26 and exhaust valve 28. Fuel injector 30 is coupled to combustion chamber 14 for delivering injected fuel into the intake manifold, head, or port in proportion to the fuel pulse width (fpw) signal received from controller 12 via conventional electronic driver 68. Fuel is delivered to fuel injector 30 by a gaseous fuel system (not shown) including a fuel tank, fuel pumps, and a fuel rail.

Turbocharger 19 has a turbine 19a coupled in the exhaust manifold 24 and a compressor 19b coupled in the intake manifold 22 via an intercooler, X. Turbine 19a is typically coupled to compressor 19b via a drive shaft 15. Various types of turbochargers and arrangements may be used. For example, a variable geometry turbocharger (VGT) may be used where the geometry of the turbine and/or compressor may be varied during engine operation. Alternately, or in addition, a variable nozzle turbocharger (VNT) may be used when a variable area nozzle is placed upstream and/or downstream of the turbine in the exhaust line for varying the effective expansion of gasses through the turbine. Still other approaches may be used for varying expansion in the exhaust, such as a waste gate valve. FIG. 1 shows an example valve 21a acting as a waste gate. As noted above, the valve may be located within the turbine, or may be a variable nozzle.

Also, a twin turbocharger arrangement, and/or a sequential turbocharger arrangement, may be used if desired. In the case of multiple adjustable turbocharger and/or stages, it may be desirable to vary a relative amount of expansion though the turbocharger, depending on operating conditions (e.g. manifold pressure, airflow, engine speed, etc.) to reduce surge while reducing driveability and/or emission impacts.

Exhaust gas sensor 38 is shown coupled to exhaust manifold 24 upstream of turbine device 19a. Aftertreatment device 40 may include any suitable type of device for reducing emissions from engine 10. Examples include, but are not limitied to, three-way and four-way catalytic converters, particulate filters, NOx traps, etc.

Controller 12 is shown in FIG. 1 as a microcomputer, including microprocessor unit 60, input/output ports 62, an electronic storage medium for executable programs and calibration values (shown as read only memory chip 64 in this particular example), random access memory 66, keep alive memory 69, and a conventional data bus. Controller 12 is shown receiving various signals from sensors coupled to engine 10, in addition to those signals previously discussed, including measurement of inducted mass air flow (MAF) from mass air flow sensor 70 coupled upstream of compressor 19b; engine coolant temperature (ECT) from temperature sensor 72 coupled to cooling sleeve 74; a profile ignition pickup signal (PIP) from Hall effect sensor 76 coupled to crankshaft 20; and manifold absolute pressure (MAP) signal from sensor 80.

Engine 10 may be configured to have variable intake valve and/or variable exhaust valve timing capabilities. For example, engine 10 may include electromechanically actuated valves that are controlled by controller 12. Alternatively, as shown in the depicted embodiment, engine 10 may include a mechanism to mechanically vary the intake and/or exhaust valve timings, for example by adjusting the timing of a camshaft. In the depicted embodiment, camshaft 90 of engine 10 is shown communicating with rocker arms 92 and 94 for actuating intake valve 26 and exhaust valve 28. Camshaft 90 is directly coupled to housing 96. Housing 96 forms a toothed wheel having a plurality of teeth 98. Housing 96 is hydraulically coupled to an inner driving member (not shown), which is in turn directly linked to crankshaft 20 via a timing chain (not shown). Therefore, housing 96 and camshaft 90 rotate at a speed substantially equivalent to the inner driving member. The inner driving member rotates at a constant speed ratio to crankshaft 20. However, by manipulation of the hydraulic coupling as will be described later herein, the relative position of camshaft 90 to crankshaft 20 can be varied by control of hydraulic pressures in advance chamber 100 and retard chamber 102. For example, by allowing high pressure hydraulic fluid to enter advance chamber 100 while allowing fluid to escape from retard chamber 102, the relative relationship between camshaft 90 and crankshaft 20 is advanced. Thus, intake valve 26 and exhaust valve 28 open and close at a time earlier than normal relative to crankshaft 20. Similarly, by allowing high pressure hydraulic fluid to enter retard chamber 102 while allowing fluid to escape from advance chamber 100, the relative relationship between camshaft 90 and crankshaft 20 is retarded. Thus, intake valve 26 and exhaust valve 28 open and close at a time later than normal relative to crankshaft 20.

Teeth 98, being coupled to housing 96 and camshaft 90, allow for measurement of relative cam position via cam timing sensor 104 providing variable camshaft timing (VCT) signal to controller 12. In the depicted embodiment, four teeth (labeled 1, 2, 3 and 4) are provided for measurement of cam timing and are equally spaced (for example, 90 degrees apart from one another) while tooth 5 at a different spacing may be used for cylinder identification. In addition, controller 12 sends control signals to conventional solenoid valves (not shown) to control the flow of hydraulic fluid either into advance chamber 100, retard chamber 102, or neither.

Relative cam timing may be measured using the method described in U.S. Pat. No. 5,548,995, which is incorporated herein by reference. In general terms, the time, or rotation angle between the rising edge of the PIP signal and receiving a signal from one of the plurality of teeth 98 on housing 96 gives a measure of the relative cam timing.

It will be understood that FIG. 1 merely shows one cylinder of a multi-cylinder engine, and that each cylinder has its own set of intake/exhaust valves, fuel injectors, etc. It will further be understood that the depicted engine 10 is shown only for the purpose of an example and that the systems and methods described herein may be implemented in or applied to any other suitable engine having any suitable components and/or arrangement of components. For example, intake valve 26 and exhaust valve 28 may be independently electromechanically actuated, and one or more camshafts, such as camshaft 90 (and various associated parts), may be omitted. Likewise, separate camshafts may be used to control the opening of intake valve 26 and exhaust valve 28. Where each valve is operated by a separate camshaft, each camshaft may include a variable timing mechanism such as that shown for camshaft 90 in FIG. 1 to allow the exhaust valve timing to be varied independent of the intake valve timing, and vice versa, via a variable cam timing system.

Note that the control and estimation routines included herein-below can be used with various engine configurations, such as those described above. Alternatively, the control and routines can be used with a mechanically driven supercharger, or with a naturally aspirated engine without a turbocharger. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 12.

Figure 2:
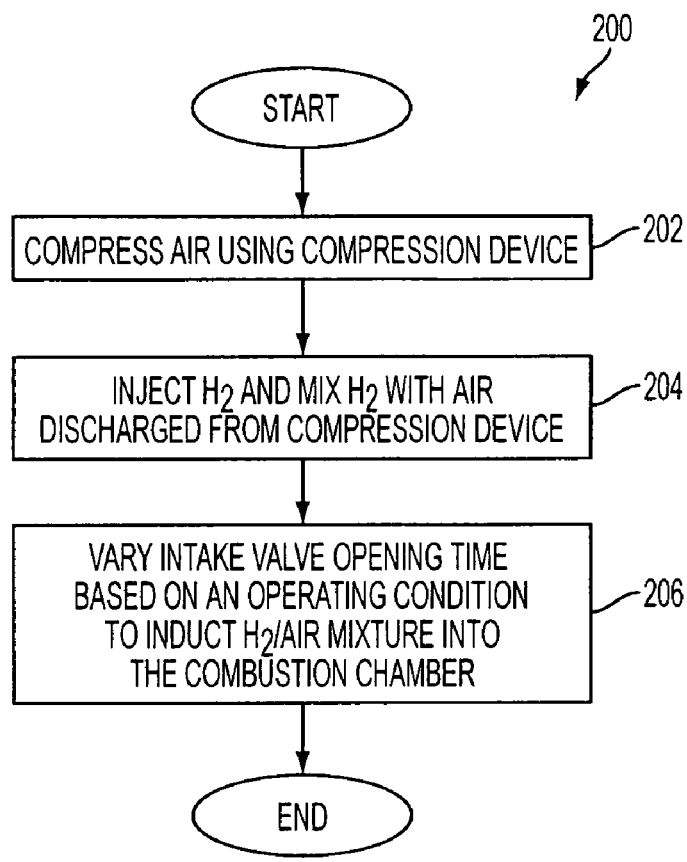
FIG. 2 is a flow diagram of an embodiment of a method of operating a hydrogen fueled engine.

FIG. 2 shows, generally at 200, a flow diagram depicting an exemplary method or routine of adjusting intake valve opening time to reduce backfiring, pre-ignition, and/or backflash. Specifically, the routine includes, at 202, compressing air using a compression device. Examples of compression devices include but are not limited to a turbocharger, supercharger, or blower. Next, at 204, the routine includes injecting hydrogen and mixing the hydrogen with air discharged from the compression device. In one embodiment, hydrogen may be injected into the intake manifold, or ports. In another embodiment, hydrogen may be mixed with boosted air in the intake manifold. In yet another embodiment, hydrogen may be injected directly into the combustion chamber, and hydrogen may be mixed with boosted air in the combustion chamber. In the case of direct injection, step 204 may occur after step 206. It should be noted that hydrogen may be pure hydrogen or it may be a mixture of hydrogen and another gas, such as another gaseous fuel. The hydrogen may also be in combination with a liquid fuel such as gasoline or diesel fuel. Additionally, injected hydrogen may also be mixed with recirculated exhaust gas (EGR) in the intake manifold or cylinder, for example. Also, the system may include an intercooler or aftercooler to reduce temperature of the compressed air.

Next, the routine includes, at 206, varying the intake valve opening time based on an operating condition to induct a hydrogen and/or air mixture into the combustion chamber. In some embodiments, the intake valve opening time is retarded as the charge temperature increases. The degree of the retardation may be adjusted with variation of numerous other operating parameters such as, for example, speed, load, fuel temperature, etc., or combinations thereof. For example, the temperature may be the temperature of the manifold, engine coolant temperature, air charge temperature, or others. The actions of method 200 can then be repeated.

Figure 3:
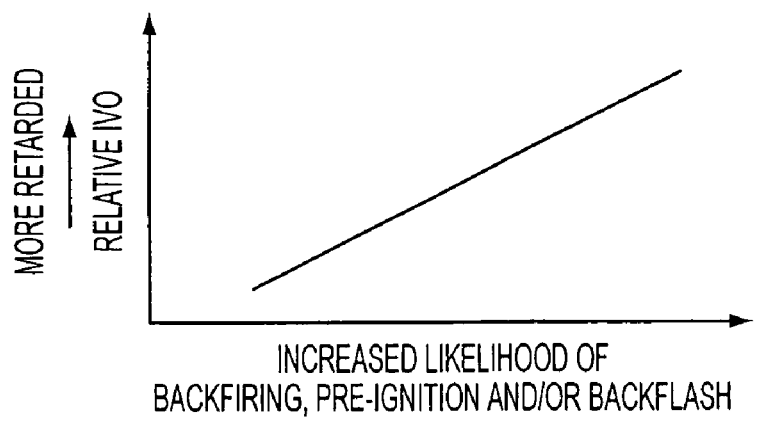
FIG. 3 is a schematic depiction of the relationship between the retardation of an intake valve opening and the likelihood of backfiring, pre-ignition, and/or backflash.

Referring now to FIG. 3, it illustrates how the intake valve timing can be varied in one example. Specifically, when the likelihood of backfiring, pre-ignition and/or backflash as indicated by at least one operating condition increases, the intake valve opening is adjusted to open later in the piston stroke, and vice versa. For example, when the temperature of the intake manifold is increased, the intake valve opening is more retarded relative to the piston top dead center, and vice versa.

The method described above may improve engine efficiency by reducing backfiring, pre-ignition, and/or backflash. For example, backfiring, pre-ignition, and backflash may be reduced in two ways. First, by retarding the intake valve opening time after the exhaust stroke is completed or the hot burned gases are expelled, there may be additional time before the hydrogen/air mixture is inducted into the cylinder. This time allows metal surfaces of the combustion chamber, including the head porting, to cool down. Cooling may occur due to conduction to cooler metal adjacent to the combustion chamber, and eventually to engine coolant flowing on the other sides of those surfaces. Second, after the exhaust valve closes and before the intake valve opens, the piston moves downward on the intake stroke. This produces an expansion of the combustion chamber contents until the intake valve opens. The expansion may result in lower gas pressure and temperature, and thus a cooler environment for the hydrogen/air mixture to enter when the intake valve finally opens.

It should be noted that retardation of intake valve opening may entail later intake valve closing time in a camshaft controlled intake valve. Later intake valve closure may result in some degradation of volumetric efficiency. Thus, in conditions where backfiring, pre-ignition, and backflash are less likely, the intake valve opening can be advanced to reduce any degradation of volumetric efficiency. Further, later intake valve closure may not significantly affect volumetric efficiency on an engine with a positive displacement supercharger such a Roots blower or screw type supercharger. Specifically, the mass of compressed air entering the cylinder may be largely independent of piston motion, thereby alleviating the effects of late intake valve closure. In this way, when using a compression device, overall performance can be maintained even when intake valve opening and/or closing is delayed relative to the piston position.

In other words, using the method 200 as described above may reduce combustion anomalies such as backfiring, pre-ignition, and/or backflash without sacrificing volumetric efficiency. For example, if the tendency for backfiring, pre-ignition, and/or backflash is greater, more retardation of the intake valve opening is required to create a cooler environment, and vice versa. By varying the degree of the retardation of intake valve opening, the intake valve opening may be adjusted to reduce the tendency of combustion anomalies to a desired extent. Thus, the reduced volumetric efficiency may be offset by the reduction in tendency for combustion anomalies.

Alternatively, the efficiency loss may be reduced by retarding the intake valve opening time only without retarding the intake valve closure. Such strategy may be implemented by using electromechanically actuated valves controlled by a controller, for example.

In another embodiment, the strategy of retarding the intake valve opening may be used in a naturally aspirated engine at high engine speeds. Specifically, combustion anomalies may become increasingly likely at higher engine speeds. Further, the volumetric efficiency degradation on a naturally aspirated engine may be mitigated at high engine speeds because the delayed intake valve closing timing may result in favorable tuning dynamics and improved volumetric efficiency.

Figure 4:
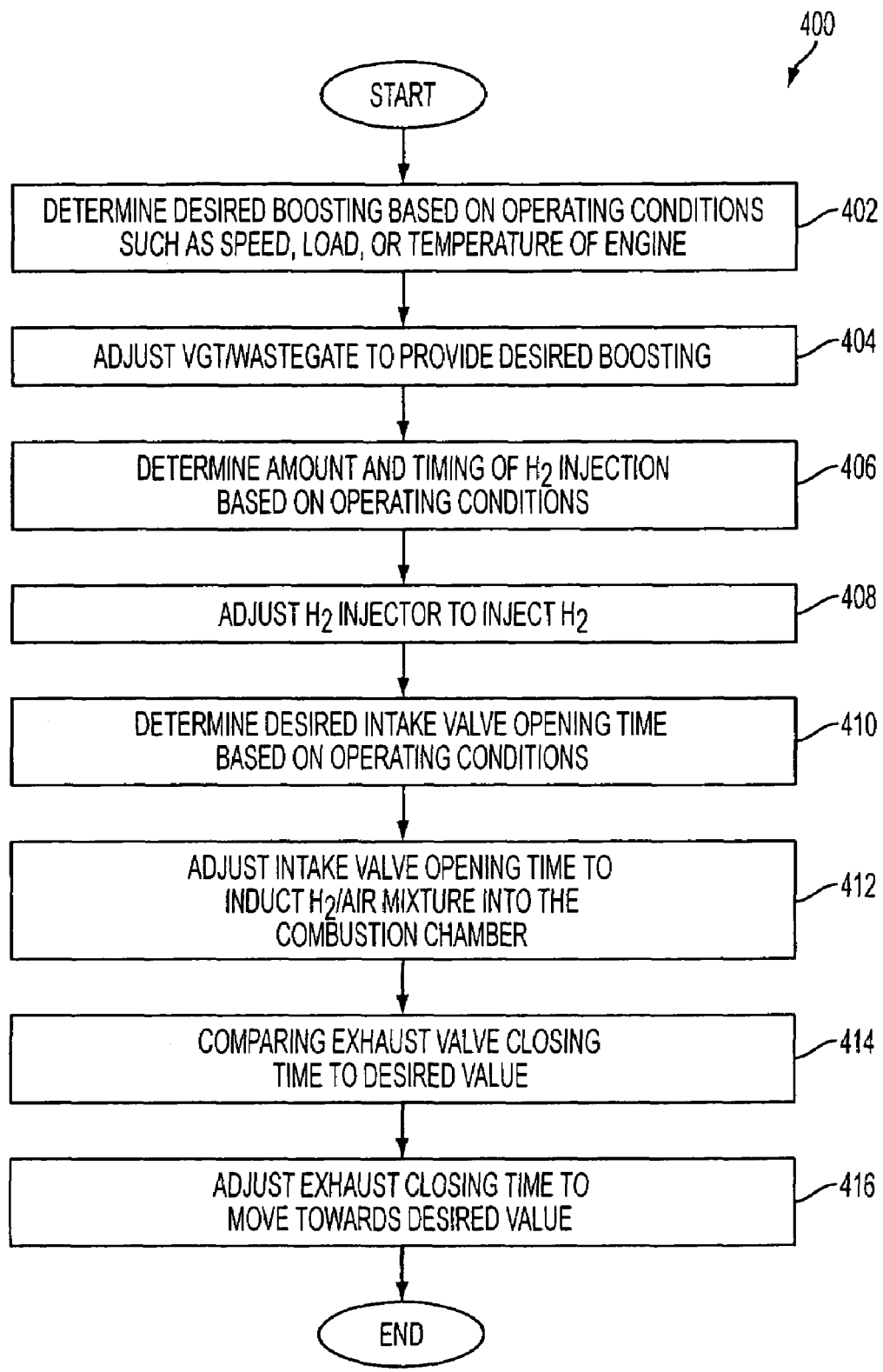
FIG. 4 is a flow diagram of another embodiment of a method of operating a hydrogen fueled engine.

In yet another embodiment, variable exhaust valve timing may be used instead of or in combination with the later the intake valve opening to avoid or reduce backfiring, pre-ignition, and/or backflash. FIG. 4 describes an example embodiment of an engine control method 400. Method 400 includes, at 402, determining desired boosting based on at least one of numerous operating conditions such as, for example, speed, load, temperature, or others to provide desired efficiency. Next, the method adjusts variable geometry turbine or wastegate to provide desired boosting at 404. Next, at 406, the routine determines the amount and timing of hydrogen injection based on operating conditions, and then at 408 the method adjusts the hydrogen injector to inject hydrogen. In one example, the hydrogen may be injected into the intake manifold. In another example, hydrogen may be injected directly into the combustion chamber. If direct injection is used, steps 406 and 408 may occur after step 412 or 416 or 418. Next, at 410, the method determines desired intake valve opening time based on operating conditions, and then at 412 the method adjusts the intake valve opening time to induct hydrogen and/or air and/or EGR into the combustion chamber. As described above, the intake valve opening may be retarded more if the tendency for backfiring, pre-ignition, and/or backflash is greater and the intake valve opening may be retarded less if the tendency is small.

From 412, the method continues to 414 to compare the current exhaust valve closing time with a desired value which may be a function of engine speed and other operating conditions. The desired value may be the exhaust valve closing time which avoids combustion anomalies with minimal trade-off in efficiency, emissions, torque, etc. If the current exhaust valve closing time is determined at 414 to be earlier or later than the desired value, then at 416 the method adjusts the exhaust valve closure timing to move towards desired value.

Note also that the timing of intake valve 26 and exhaust valve 28 may be adjusted in any suitable manner. For example, where engine 10 utilizes an electromechanically controlled intake valve and exhaust valve, controller 12 may be configured to vary the timing of an actuation signal supplied to the intake valve and exhaust valve. Alternatively, as in the depicted embodiment, controller 12 may be configured to vary the timing of the rotation of camshaft 90 relative to crankshaft 20. As described above, in some vehicles, separate camshafts may be utilized to open the intake and exhaust valves, while in other vehicles, a single camshaft may open both the intake and exhaust valves. Therefore, different timing strategies may be employed for different engine configurations.

In addition to the benefits described above for the retardation of intake valve opening time, the method 400 provides more advantages. For example, at low speed, the method 400 uses the combination of late intake valve opening and early exhaust valve closure. This approach may reduce the degradation of volumetric efficiency. Further, the overall effect of early exhaust valve closure and late intake valve opening on pumping work may be small compared to varying the intake valve timing only. For example, although early exhaust valve closure adds compression work during the late part of exhaust stroke, energy or work stored by excess exhaust due to the early exhaust valve closure is not released at the end of exhaust stroke due to the late opening of the intake valve. In addition, there is no vacuum or less vacuum during the early phase of an intake stroke because of the existence of exhaust gas after early exhaust valve closure. Therefore, pumping work may not be increased, or any increase is reduced, by using variable timing of both the exhaust valve and intake valve.

Further, the propensity to backfiring, pre-ignition, and/or backflash may be further reduced by early exhaust valve closure. For example, when the exhaust valve is closed before the top dead center, less oxygen is available to cause backfiring, pre-ignition, and/or backflash because residual gases from the previous cycle may be left in the combustion chamber. At low engine speed, the combustion anomalies are not as bad as that at high speed. Thus, it may reduce backfiring, pre-ignition, and/or backflash simply by making less oxygen available in the combustion chamber. Alternatively, the method may close the exhaust valve close to TDC if necessary to avoid backfiring, pre-ignition, and/or backflash.

As another example of the advantages, at high engine speed, the method 400 may significantly reduce the tendency for combustion anomalies such as backfiring, pre-ignition, and/or backflash. At high engine speed, combustion anomalies become worse. The combination of late intake valve opening and early exhaust valve closure may not reduce these anomalies efficiently. For this reason, at high engine speed, the method 400 may use the combination of late intake valve opening and late exhaust valve closure. The late exhaust valve closing allows the exhaust residual in the combustion chamber to be minimized to decrease the resultant temperature of the new cycle charge after mixing with the fresh incoming $H_2$/air mixture. The late exhaust valve closure and late intake valve opening may reduce the volumetric efficiency. However, any reduction in torque due to reduced volumetric efficiency may be more than offset by the reduction in tendency for combustion anomalies.

It will be appreciated that the processes disclosed herein are exemplary in nature, and that these specific embodiments are not to be considered in a limiting sense, because numerous variations are possible. The subject matter of the present disclosure includes all novel and non-obvious combinations and subcombinations of the injection timings, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the injection and valve timing and temperature methods, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a hydrogen fueled internal combustion engine, the engine also including a combustion chamber, an intake manifold, an exhaust manifold, at least one intake valve, at least one exhaust valve, a hydrogen injector, and a compression device, the method comprising:
compressing air using the compression device;
injecting hydrogen and mixing at least said hydrogen with air discharged from the compression device; and
opening the intake valve to induct at least air into the combustion chamber, wherein the intake valve opening time varies with an operating condition.

2. The method of claim 1, wherein the operating condition is one of temperature, speed, and load of the engine.

3. The method of claim 1, wherein the compression device is one of a supercharger and a turbocharger.

4. The method of claim 1, wherein the engine further comprises one of the intercooler and aftercooler to reduce temperature of the compressed air.

5. The method of claim 1, wherein hydrogen is injected into the intake manifold.

6. The method of claim 1, wherein hydrogen is injected directly into the combustion chamber.

7. The method of claim 1, wherein hydrogen injection occurs before the intake valve opens.

8. The method of claim 1, wherein the hydrogen injection occurs after the intake valve opens.

9. The method of claim 1, wherein the intake valve opening time is more retarded relative to top dead center when the operating conditions indicate an increased tendency of backfiring, pre-ignition, and/or backflash.

10. The method of claim 1, wherein the intake valve opening time is less retarded relative to the top dead center when the operating conditions indicate a decreased tendency of backfiring, pre-ignition, and/or backflash.

11. A method for operating a hydrogen fueled internal combustion engine, the engine also including a combustion chamber, an intake manifold, an exhaust manifold, at least one intake valve, at least one exhaust valve, a hydrogen injector, and a compression device, the method comprising:
    compressing air using the compression device;
    injecting hydrogen and mixing at least said hydrogen with air discharged from the compression device; and
    opening the intake valve to induct at least air into the combustion chamber wherein the intake valve opening time varies with a first operating condition to reduce the tendency of backfiring, pre-ignition, and/or backflash; and
    varying the exhaust valve closing time with a second operating condition.

12. The method of claim 11, wherein the first and second operating conditions are one or more of air temperature, engine temperature, engine speed, and engine load.

13. The method of claim 11, wherein hydrogen is injected into the intake manifold.

14. The method of claim 11, wherein hydrogen is injected directly into the combustion chamber.

15. The method of claim 11, wherein the hydrogen injection occurs before the intake valve opens.

16. The method of claim 11, wherein the hydrogen injection occurs after the intake valve opens.

17. The method of claim 11 wherein the intake valve opening time is more retarded relative to piston top dead center when the operating first condition results in an increased tendency of backfiring, pre-ignition, and/or backflash, and the intake valve opening is less retarded relative to piston top dead center when the operating first condition results in a decreased tendency of backfiring, pre-ignition, and/or backflash.

18. The method of claim 11, wherein the exhaust valve closing time is advanced with respect to piston top dead center when the engine speed is lower, and the exhaust valve closing time is retarded with respect to piston top dead center when the engine speed is higher.

19. A system for a hydrogen fueled engine, comprising:
    a combustion chamber;
    a hydrogen injector;
    a compression device;
    a controller to vary an intake valve opening timing and an exhaust valve closing timing with an operating condition to reduce backfiring, pre-ignition, and/or backflash.

20. The system of claim 19, wherein the operating condition is one or more of air temperature, engine temperature, engine speed, and engine load.

21. The system of claim 19, wherein the controller varies the intake valve opening timing so that it Is more retarded relative to piston top dead center when the operating conditions result in an increased tendency of backfiring, pre-ignition, and/or backflash, and varies the intake valve opening so that it is less retarded relative to piston top dead center when the operating conditions result in a decreased tendency of backfiring, pre-ignition, and/or backflash.

* * * * *